United States Patent [19]

Hamano

[11] Patent Number: 5,031,003
[45] Date of Patent: Jul. 9, 1991

[54] METHOD AND DEVICE FOR CIRCULARLY TRANSPORTING DOCUMENT TO AN EXPOSURE STATION AND COPYING APPARATUS THEREFOR

[75] Inventor: Hiroaki Hamano, Osaka, Japan

[73] Assignee: Minolta Camera Kabushiki Kaisha, Osaka, Japan

[21] Appl. No.: 421,832

[22] Filed: Oct. 16, 1989

[30] Foreign Application Priority Data

Oct. 17, 1988 [JP] Japan .................. 63-262446

[51] Int. Cl.$^5$ .......................................... G03G 21/00
[52] U.S. Cl. .................................... 355/318; 271/301; 355/309; 355/311; 355/316
[58] Field of Search ............... 355/318, 316, 311, 321, 355/309; 271/301

[56] References Cited

U.S. PATENT DOCUMENTS

| | | | |
|---|---|---|---|
| 3,770,348 | 11/1973 | Martin . | |
| 4,445,682 | 5/1984 | Uchida | 355/311 X |
| 4,465,271 | 8/1984 | Saitoh et al. | 271/301 X |
| 4,713,674 | 12/1987 | Giezeman et al. | 355/316 |
| 4,816,865 | 3/1989 | Hamano | 355/309 X |
| 4,905,044 | 2/1990 | Hamano | 271/3.1 X |

FOREIGN PATENT DOCUMENTS

| | | | |
|---|---|---|---|
| 0188055 | 11/1982 | Japan | 355/316 |
| 0101871 | 5/1988 | Japan | 355/204 |
| 0149634 | 6/1988 | Japan | 355/316 |

OTHER PUBLICATIONS

Xerox Disclosure Journal, vol. 8, No. 4, Jul./Aug. 1983, p. 357, "Constant Velocity Transport for Multiple Copying of Documents and Books", J. May.

*Primary Examiner*—A. T. Grimley
*Assistant Examiner*—Matthew S. Smith
*Attorney, Agent, or Firm*—Burns, Doane, Swecker & Mathis

[57] ABSTRACT

A circulating type document transporting device and a copying apparatus equipped with this document transporting device which includes circulating document transporting paths so as to transport an original document to an exposure station circularly, the circulating document transporting paths having a plurality of bypass paths on both sides of the exposure station for circulation of the original document along the proper bypass path in accordance with a document size.

15 Claims, 8 Drawing Sheets

METHOD AND DEVICE FOR CIRCULARLY TRANSPORTING DOCUMENT TO AN EXPOSURE STATION AND COPYING APPARATUS THEREFOR

BACKGROUND OF THE INVENTION

1. Field of the invention

The present invention relates to a method and a device in which an original document is transported to an exposure station circularly, and a copying apparatus with said document transporting device.

2. Description of Related Art

Conventionally, the above-described document transporting device has been proposed in various prior arts such as in U.S. Pat. No. 3,770,348, U.S. Pat. No. 4,445,682, U.S. Pat. No. 4,465,271, and U.S. Pat. No. 4,816,865. These devices generally comprise a plurality of bypass paths for efficient document circulation and transportation and are so arranged to enable selection of the proper document circulating and transporting path according to a document size.

In those conventional circulating document transporting devices, means for changing the length of the circulating transporting path have been provided on only one side of the exposure station. In such construction, the number of change-over transporting paths equalling to the number of the circulating transporting paths would be required. And if more types of the circulating document transporting paths of different lengths are to be provided, it becomes necessary to increase the number of the change-over transporting paths in accordance with the circulating transporting paths. That causes an increase of parts as well as the complexity of the device.

SUMMARY OF THE INVENTION

Accordingly, a main object of the present invention is to provide an efficient document circulating and transporting method.

Other objects of the present invention are to provide a circulating document transporting device with simple arrangement, and which is capable of circulating the original document efficiently, still best suited for use in a copying device.

The method of the present invention makes it possible to transport the original document efficiently by changing over the circulating paths on both sides of an exposure station.

Moreover, the present invention provides the circulating document transporting device comprising a plurality of circulating paths on both sides of the exposure station.

Furthermore, the present invention is to provide a copying apparatus which includes the circulating document transporting device with a plurality of circulating paths on both sides of the exposure station.

BRIEF DESCRIPTION OF THE DRAWINGS

An embodiment of this invention will be described with reference to the accompanying drawings, in which.

DETAILED DESCRIPTION OF THE PREFERRED EMBODIMENT

Figure 1:
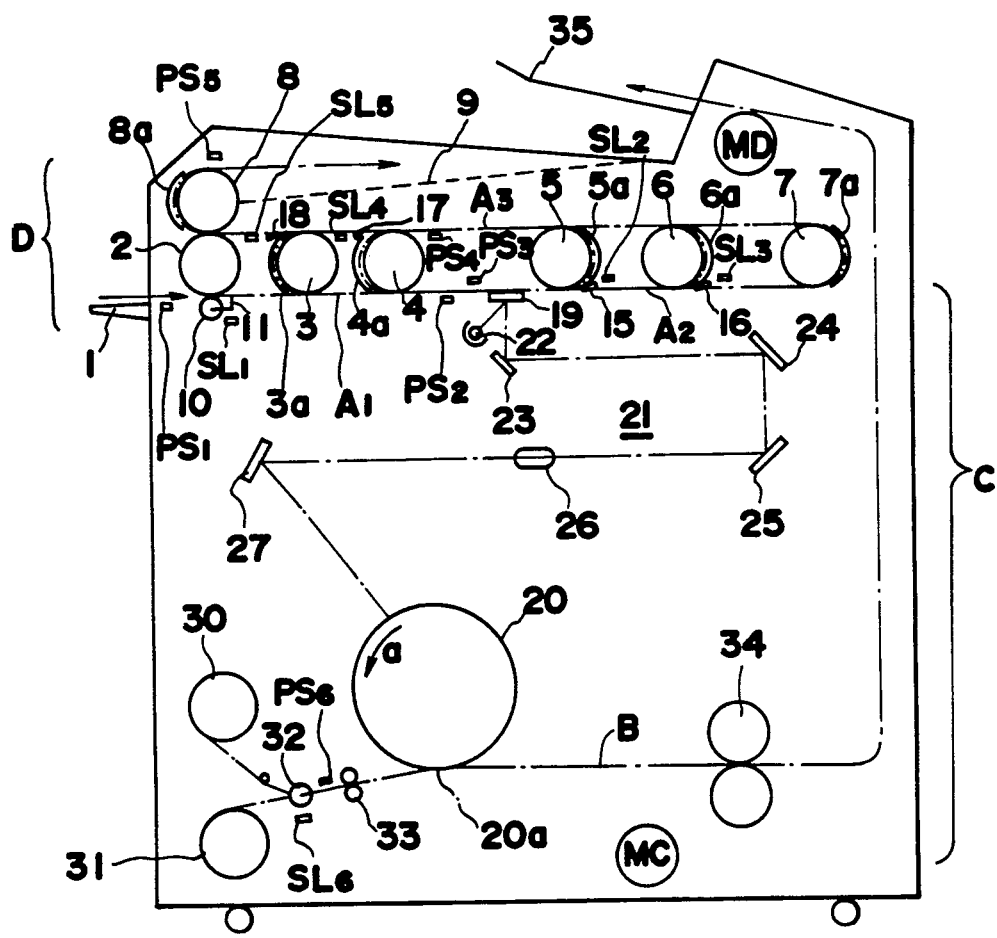
FIG. 1 is a cross-sectional view showing a summary arrangement of a copying device comprising a circulating document transporting device.

FIG. 1 shows an embodiment of an electrophotographic copying machine according to the present invention. The copying machine basically comprises a document transporting device of a document circulating type D and a body proper of the copying machine of an electrophotographic system C.

The document transporting device D for transporting a document to an exposure station 19 which is inside the body of the copying machine C mainly comprises a document insertion guide plate 1, a document supplying transporting roller 2, circulating transporting rollers 3-7, a discharging roller 8, and a receiving tray 9. These rollers constitute together a first transporting path A1 from the document supplying transporting roller 2 to the exposure station 19, a second transporting path A2 from the exposure station 19 to the document circulating transporting roller 7, and a third transporting path A3 from the circulating document transporting roller 7 to the discharging roller 8. A first main motor MD drives the rollers 2-8.

Figure 2:
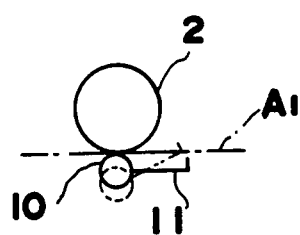
FIG. 2 is an enlarged view of a document inserting section.

Below said document supplying roller 2 rotating counterclockwise, there are detachably disposed a document inserting roller 10 and a stopper 11 integrally arranged therewith. The inserting roller 10 and the stopper 11 are moved by a solenoid SL1 from a position indicated FIG. 2 by a dotted line to a position indicated by a solid line. When the solenoid SL1 is turned off, the inserting roller 10 is separated from the document supplying transporting roller 2 and the stopper 11 is located in the first transporting path A1 as indicated by the dotted line. On the other hand, when the solenoid SL1 is turned on, the inserting roller 10 is brought into contact with the transporting roller 2 and the stopper 11 is retracted from the first transporting path A1 as indicated by the solid line.

The circulating document transporting rollers 3 and 4 are disposed on the document supplying tray side of the exposure station 19. The circulating document transporting rollers 5,6 and 7 are on the side disposed of the exposure station 19 opposite the document supplying tray. These circulating document transporting rollers 3-7 rotatable in the counterclockwise direction feed at first the document transported by the document supplying roller 2 to the exposure station 19 along the first transporting path A1. Following the exposure, the exposed document is then fed to the document discharging roller 8 along the second transporting path A2 and the third transporting path A3.

Further, in the vicinity of the document transporting roller 5, a change-over claw 15 and a guide plate 5a are provided for reversing the exposed document to the third transporting path A3 by the transporting roller 5 without passing by the transporting roller 7. Similarly, near the document transporting roller 6, a change-over claw 16 and a guide plate 6a are provided for reversing the exposed document to the third transporting path A3 by the transporting roller 6 without passing by the transporting roller 7.

Figure 3A:
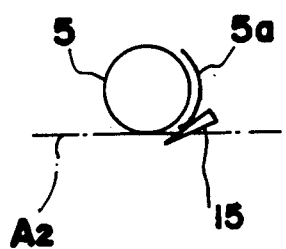
FIGS. 3a and 3b are enlarged views of a first change-over claw and a second change-over claw.
Figure 3B:
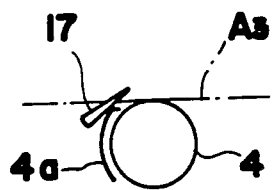

Near the document transporting roller 4 a change-over claw 17 and a guide plate 4a are disposed for reversing a reversed document again by the transporting roller 4 and feeding the document into the first transporting path A1. Similarly, near the document transporting roller 3, a change-over claw 18 and a guide plate 3a are disposed for reversing the reversed document again by the transporting roller 3 and feeding the document into the first transporting path A1. Said change-over claws 15 and 16 are caused to protrude into and retract out of the second transporting path A2 by a solenoid 2(SL2) and a solenoid 3(SL3) respectively (cf. FIG. 3(a)). Similarly, said change-over claws 17 and 18 are caused to protrude into and retract out of the third transporting path A3 by a solenoid 4(SL4) and a solenoid 5(SL5) respectively (cf. FIG. 3(b)).

And beside the document discharging roller 8, a guide plate 8a is provided to form a document discharging path.

In said arrangement, for example, if only the change-over claw 18 is protruded into the document transporting path, the original document which passed the exposure station 19 is circulated along the circulating path formed by the transporting rollers 3 and 7. On the other hand, if both the change-over claws 15 and 17 are protruded into in the document transporting path, the original document is circulated along the circulating path formed by the transporting rollers 4 and 5. A detailed description will be given with reference to FIG. 9 hereinbelow.

Furthermore, first to fourth photosensors PS1-PS4 for detecting the original document are disposed in the document transporting paths. The first sensor PS1 is provided close to a document inserting entrance for detecting an insertion of the original document. The second sensor PS2 is provided between the circulating document transporting roller 4 in the first transporting path A1 and the exposure station 19 to detect the arrival of the original document at a standard position. The third sensor PS3, provided between the sensor PS2 and the exposure station 19, determines timings for commencing timers A-F which will be described hereinbelow. The sensor PS4 is disposed close to the document circulating transporting roller 4 in the third transporting path A3 to control a time sequence for an operation of the change-over claws 17 and 18. A sensor PS5 is disposed close to the document ejecting roller 8 to detect the discharge of the original document.

Figure 9:
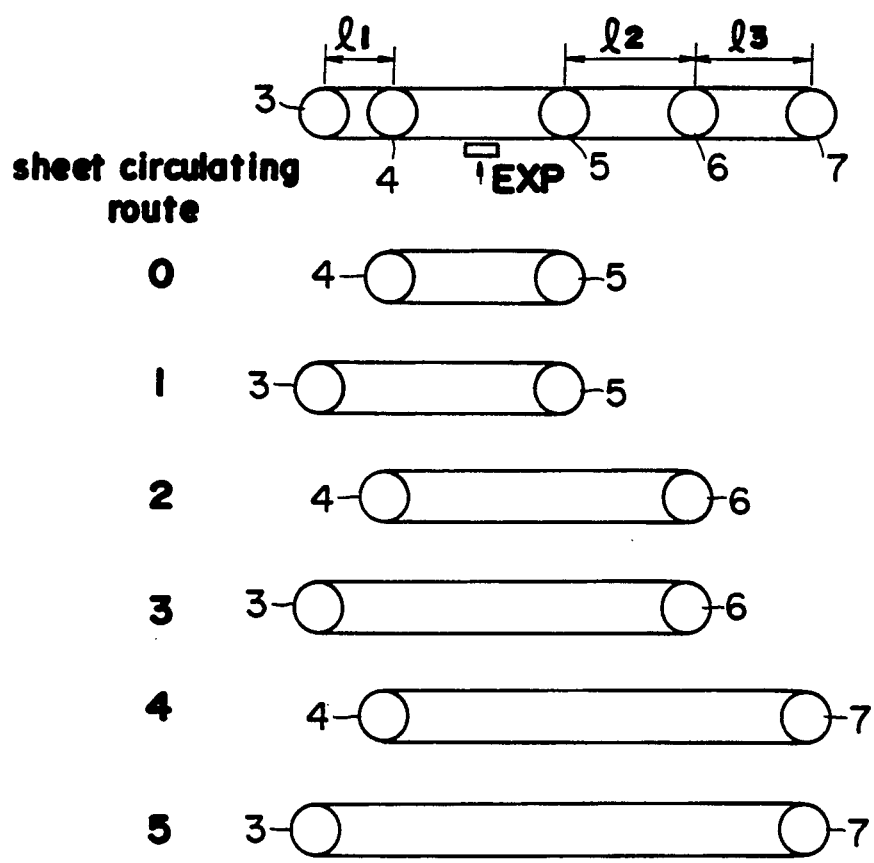
FIG. 9 is a diagram illustrating a circulating path.

FIG. 9 shows a distance relationship among said transporting rollers 3-7.

Namely, as shown in FIG. 9, the transporting rollers are provided to satisfy the relationship $l_1 < l_3$ as well as $l_1 < l_2$, wherein $l_1$ is a distance between the transporting rollers 3 and 4, $l_2$ a distance between the transporting rollers 5 and 6, $l_3$ a distance between the transporting rollers 6 and 7.

Here, a sheet circulating path "0" is a document circulating transporting path arranged by the transporting rollers 4 and 5, "1" the path arranged by the transporting rollers 3 and 5, "2" the path arranged by the rollers 4 and 6, "3" the path arranged by the rollers 3 and 6, "4" the path arranged by the rollers 4 and 7 and "5" the path arranged by the rollers 3 and 7. Said numbers "0"-"5" of the sheet circulating path show the order of the lengths of the document circulating transporting paths from shortest to longest, so that "0" is the shortest path and "5" is the longest. The maximum length of the document transportable along the shortest sheet circulating path "0" is shorter than the distance from the sensor PS1 to the change-over claw 15. The maximum length of the document transportable along the sheet circulating path "1" is longer than the distance from the sensor PS1 to the change-over claw 15 but shorter than that to the change-over claw 16. The maximum length of the document transportable along the sheet circulating path "2" is shorter than the distance from the sensor PS1 to the change-over claw 16 whereas the maximum length of the document transportable along the sheet circulating path "3" is longer than the distance from the sensor PS1 to the change-over claw 16.

In said arrangement, when an original document is inserted along the surface of the guide plate 1 with the leading end of the original document sensed by the sensor PS1, the solenoid SL1 is energized to press the inserting roller 10 against the transporting roller 2. The stopper 11 is then caused to be retracted from the document transporting path to prepare for transportation of the original document. The original document is thus fed in the direction indicated by the arrow. Then the original document is transportable along each roller through the guide plates 3a-8a respectively.

Which sheet circulating path the original document is transported along is determined by the timers A-F and the sensor PS1. The original document is fed along the circulating path "0" to circulate along the rollers 4 and 5 by the protrusion of the change-over claws 15 and 17 into the path. On the other hand, the protrusion of the change-over claw 16 and 17 into the path causes the original document to circulate along the rollers 4 and 6. With only the change-over claw 17 protruding into the path, the original document is circulated along the path "4", that is to say along the the transporting rollers 4 and 7. When the change-over claws 15 and 18 are protruding into the transporting path, the original document is circulated along the circulating path "1", namely, along the transporting rollers 3 and 5. When the change-over claws 16 and 18 are protruded in the transporting path, the original document is circulated along the circulating path "3", namely, along the transporting rollers 3 and 6. When only the change-over claw 18 is protruded into the transporting path, the original document is circulated along the circulating path "5", that is, along the transporting rollers 3 and 7. Finally, if the change-over claws 17 and 18 are retracted from the transporting path, the original document is discharged from the discharging roller 8 into the receiving tray 9.

Next, a description will be directed on the general construction of the body of the copying device C.

A photosensitive drum 20 is rotatably driven in a direction indicated by an arrow a and along its periphery well-known image forming elements are provided such as an electric charger and a developing means (not illustrated). An optical system 21 includes an exposure lamp 22, mirrors 23, 24 and 25, a lens 26 and a mirror 27 so as to successively expose the original document transported on a glass plate 19 located between the transporting rollers 4 and 5 to effect a slit exposure on the photosensitive drum 20 by use of a reflected light from the original document.

Two kinds of copy paper 30 and 31 in a shape of a roll are installed so as to be selectively supplied for the copy operation. The selected copy paper is transported through a cutter 32 and a timing roller pair 33 driven by the solenoid SL6 to a transfer station 20a. The copy paper on which the image is transferred by the transfer station 20a is transported as indicated by a single dotted line B in FIG. 1 and then the image is fixed by a fixing unit 34. The copy paper is then discharged into the receiving tray 35 located in the upper station of the copying machine. In addition, there is disposed a copy paper detecting sensor PS6 immediately upstream of the timing roller pair 33. Said photosensitive drum 20, timing rollers 33 and fixing unit 34 are driven by the main motor of the copying machine.

Figure 4:
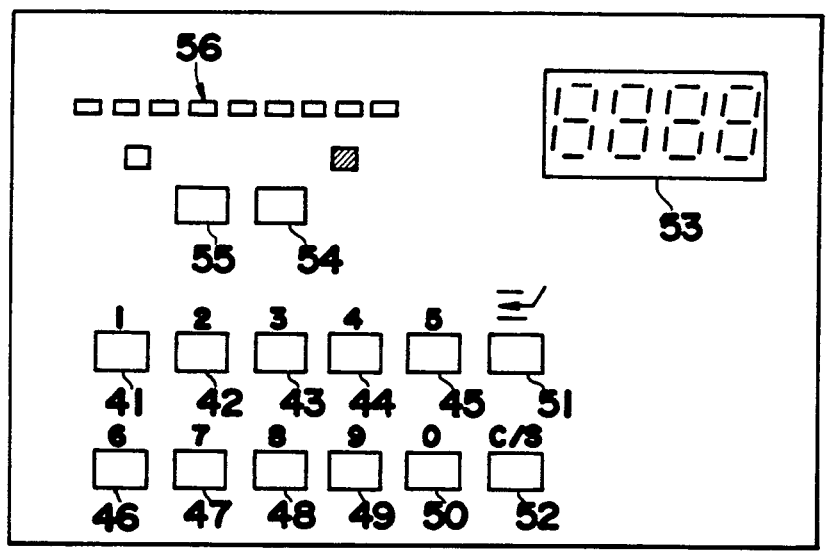
FIG 4 is a plan view of an operation panel.

FIG. 4 is a schematic diagram showing an operation panel including ten keys 41–50 for setting the number of copies to make, an interruption key 51, a clear/stop key 52, and a display section 53 to display, for example, the number of copies and trouble codes such as a code for a paper jam. The operation panel further comprises up-/down keys 54 and 55 to vary the amount of exposure and a group of display LED's 56.

Figure 5:
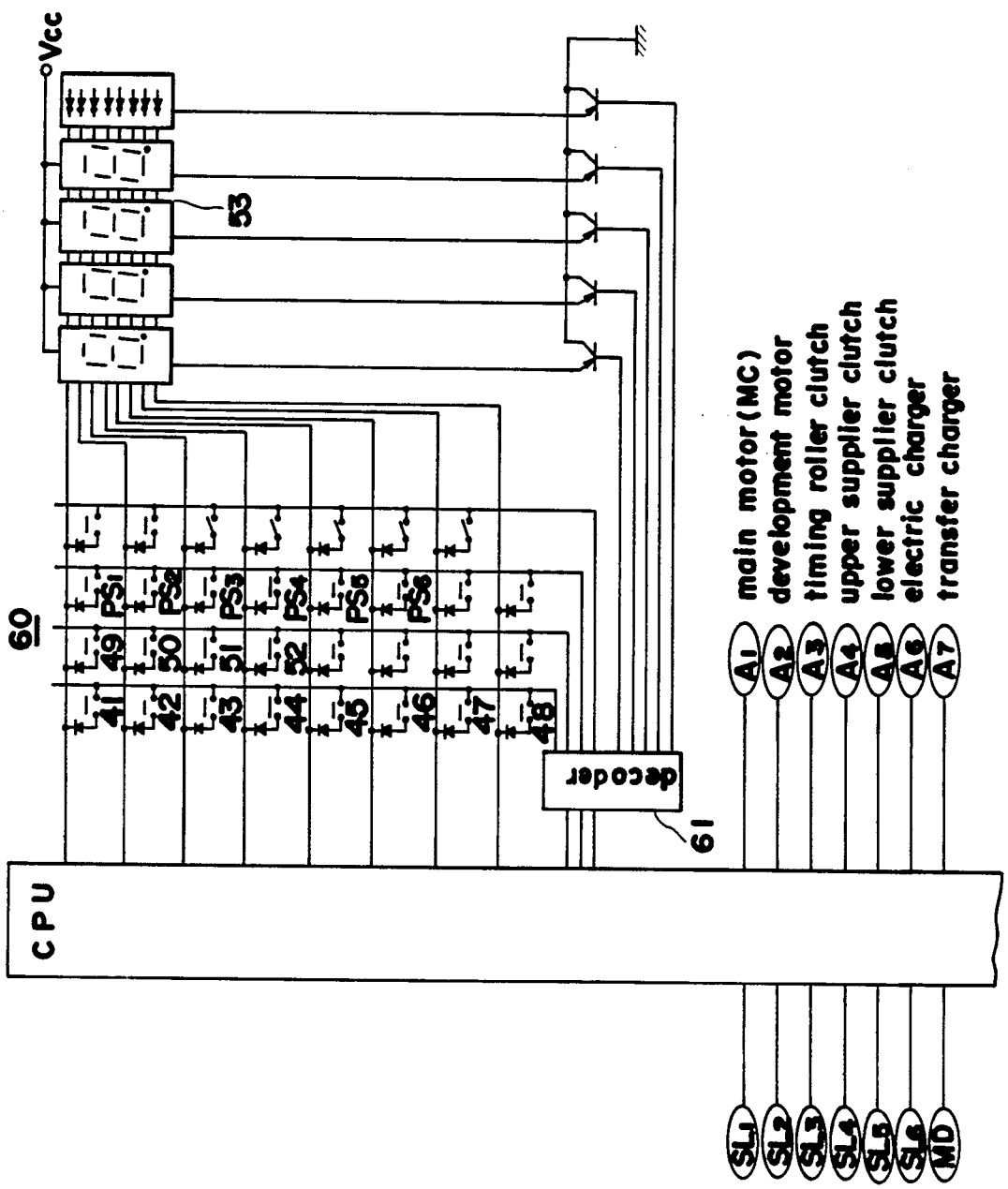
FIG. 5 is a block diagram useful to explain a control circuit of the copying device.

FIG. 5 is a schematic circuit diagram showing a control circuit in which a switch matrix 60 is connected to a microcomputer CPU controlling the operations of the copying machine C as well as the automatic document circulating transporting device D. The display section 53 is connected via the matrix 60 and a decoder 61 to the CPU. Furthermore, the CPU has output terminals connected to the solenoids SL1–SL6, the first main motor MD, the second main motor MC, a paper supplying clutch, various chargers, and the like.

Now description will be briefly given on the operation of the circulating document transporting device constituted as described above.

The copying machine C starts a copy operation when the sensor PS1 detects a condition that an original document is inserted from the guide plate 1.

Namely, when the original document is inserted along the surface of the guide plate 1 and a leading end of the original document is sensed by the sensor PS1, the solenoid SL1 is turned on to press the inserting roller 10 against the transporting roller 2 which in turn causes the stopper 11 to be retracted from the document transporting path. The original document is now fed in the direction indicated by the arrow. As the original document is sensed by the sensor PS2, the rotations of the respective transporting rollers are temporarily stopped. The copy paper 30 or 31 in the roll shape selected beforehand is then supplied, and when a leading end of the copy paper 30 or 31 is sensed by the sensor PS6, the paper supplying operation is temporarily stopped.

In this way, when the original document and the copy paper are set in the predetermined positions, the original document is transported first to undergo the exposure from the optical system 21 so as to form an electrostatic latent image of the document image on the peripheral surface of the photosensitive drum 20. The latent image is then developed into a toner image by a developing device (not shown). When a predetermined period of time has been elapsed after the leading end of the document is detected by the sensor PS3, the timing roller pair 33 is driven so as to transport the copy paper to the transfer station 20a in synchronization with the toner image. The cutter 32 is operated at a timing associated with the length of the document to cut the copy paper.

Next, referring to flowcharts, the operation of the circulating document transporting device will be described in detail.

Figure 6:
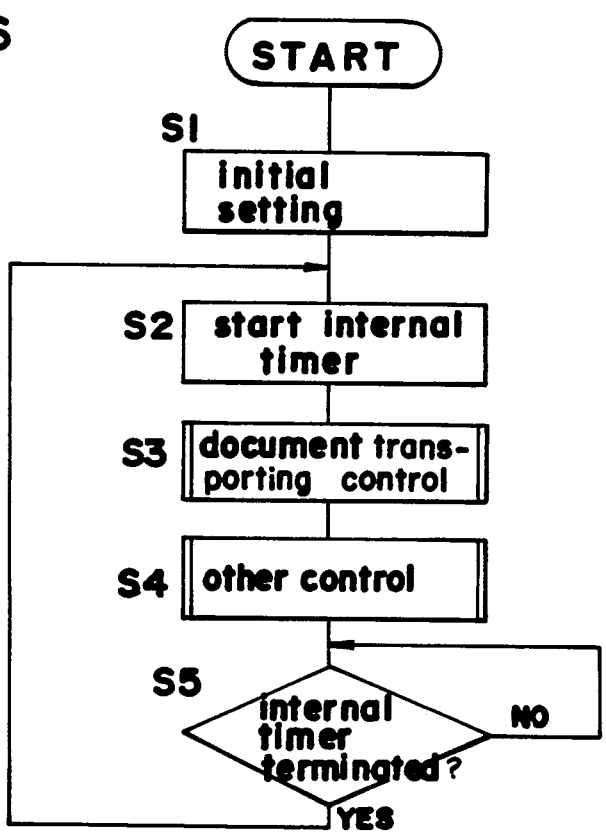
FIG. 6 is a flowchart of a main routine generally indicating a microcomputer process.

FIG. 6 is a flowchart of a main routine of the microcomputer CPU. When the CPU is activated to start the program, step S1 is executed to clear the random access memory RAM to initialize various registers, and to initialize the respective components to the initial mode. Thereafter, step S2 is executed to start an internal timer to determine a period of time required for the main routine and the value thereof is set during the initial setting operation in the step S1.

Next, in step S3, a subroutine controlling the transportation of the original document (to be described later) is called, and in step S4, a subroutine controlling the other process is called. The step S4 controls the copy operation or the like, a description thereof will be omitted as it is well-known in the art.

Furthermore, in step S5, it is judged whether or not said internal timer has been terminated. After the timer is terminated, control is returned to the step S2. The period of time required for one routine is used for counting timers A–F, which will be described as follows.

Figure 7A:
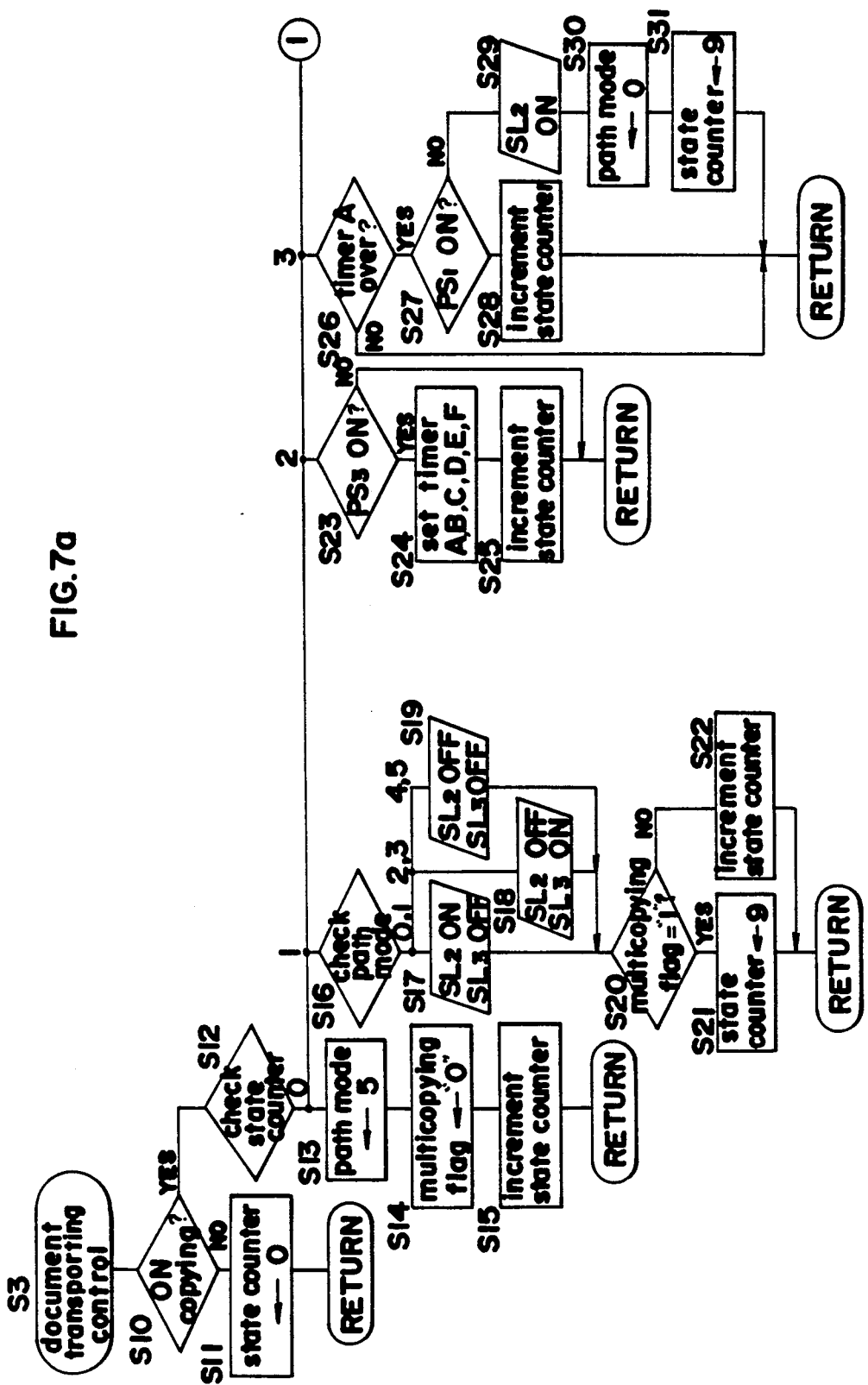
FIGS. 7a, 7b, 7c are flowcharts indicating subroutines of path control.
Figure 7B:
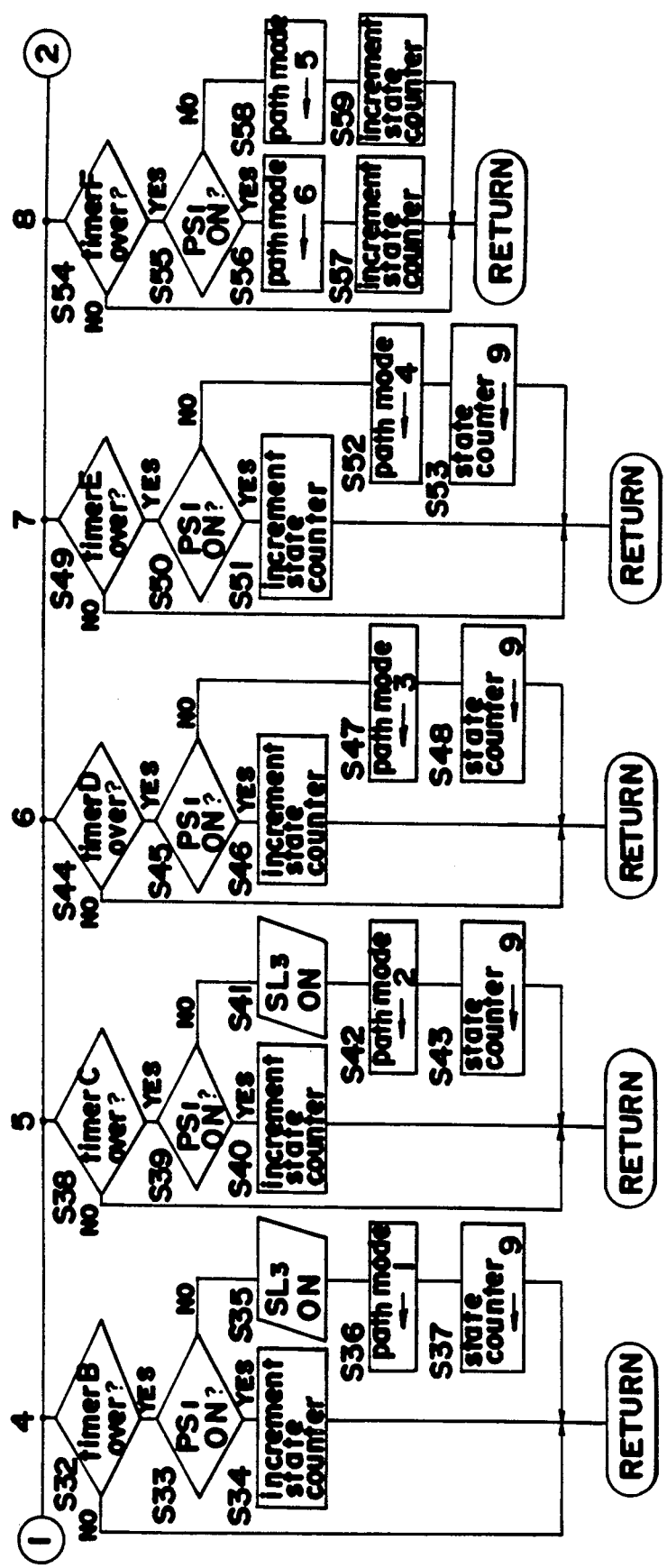
Figure 7C:
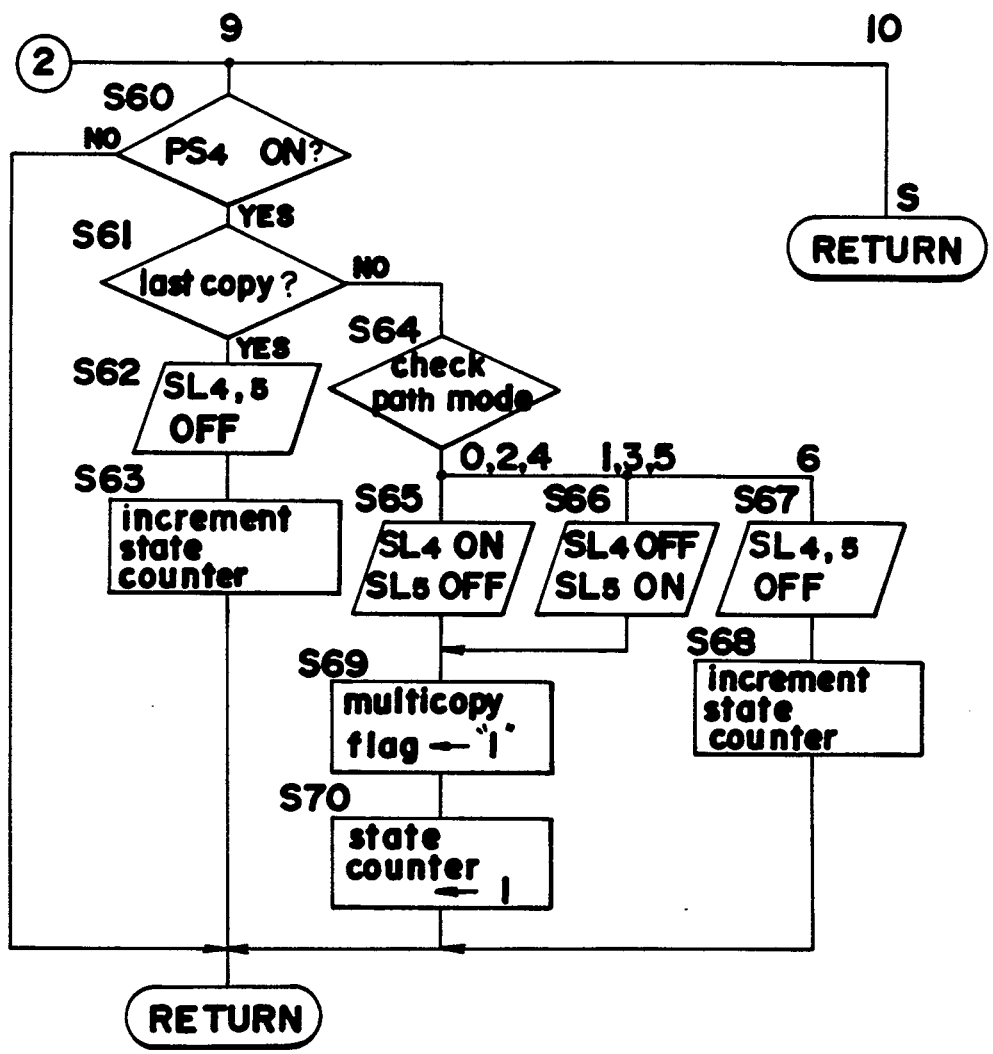

FIG. 7 illustrates a subroutine executed in the step S3 of the main routine to control the document transportation.

At first, step S10 determines whether or not the copy operation has begun. When the copy operation has not been effected, step S11 resets a state counter to "0" to terminate this subroutine. When the copy operation is on, step S12 judges the state counter so as to select the subsequent step according to the count value.

If the state counter is "0" indicating the initial state, step S13 turns a memory area of a path mode to 5. Next, in step S14, a multicopy flag is reset to "0". This multicopy flag is "0" when the copy is first one and "1" from the second copy. Then step S15 increments the state counter to terminate this subroutine.

Figure 8:
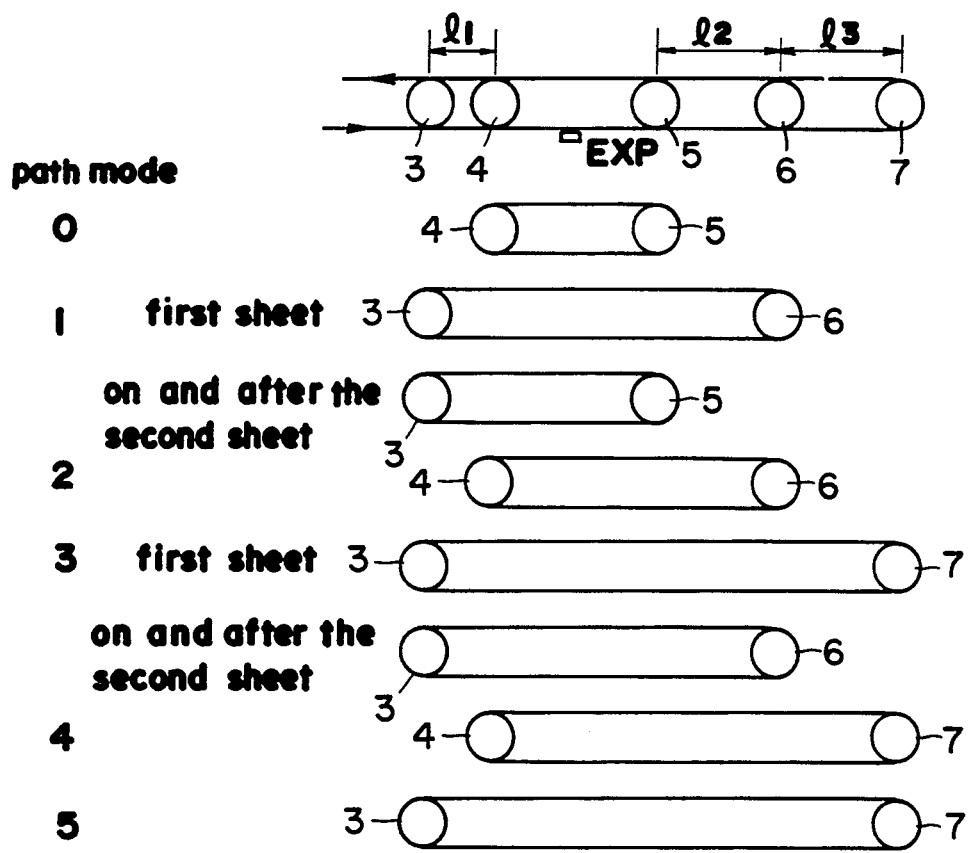
FIG. 8 is a diagram useful to explain a path mode.

The following path modes "0"–"5" indicate the document circulating transporting paths formed by the respective rollers as illustrated in FIG. 8.

When the state counter indicates 1, step S16 determines the path mode. If the path mode is "0" or "1", step S17 turns the solenoid SL2 on and solenoid SL3 off. This causes the change-over claw 15 to protrude into the transporting path for transporting the original document along the transporting roller 5. When the path mode is "2" or "3", step S18 turns the solenoid SL2 off and solenoid SL3 on. This causes the change-over claw 16 to protrude into the transporting path for transporting the original document along the transporting roller 6. When the path mode is "4" or "5", in step S19, both the solenoid SL2 and SL3 are turned off to retract the change-over claws 15 and 16 from the transporting path. Then the original document is set to be transported along the transporting roller 7.

Step S20 judges whether or not the multicopy flag indicates 1. If the multicopy flag indicates 1, namely, the copy is the second and following copies, step S21 sets the state counter to "9". If the multicopy flag is 0, that is, the copy is the first one, step S22 increments the state counter.

When the state counter indicates "2", step S23 determines whether or not the sensor PS3 is on. If the sensor PS3 is on, namely, the leading end of the original document is detected by the sensor PS3, step S24 sets the timers A-F, and then step S25 increments the state counter.

When the state counter indicates "3", step S26 judges whether or not the timer A is over, that is, the timer A has timed out. If the timer A is over, step S27 determines whether or not the sensor PS1 is on. If the sensor PS1 is on, step S28 increments the state counter; otherwise, step S29 turns the solenoid SL2 on. Then, step S30 sets the path mode to "0" and step S31 sets the state counter to "9".

Namely, the timer A is set to a period of time during which a trailing edge of the original document of maximum length transportable along the sheet circulating path "0", that is, along the transporting rollers 5 and 4 reaches the sensor PS1. If the trailing edge of the original document has passed the sensor PS1 before timer A is over, the length of the document is judged shorter than the maximum length transportable along the circulating path "0" and the step S30 sets the path mode to "0".

When the state counter indicates "4", step S32 determines whether or not the timer B has been over. In case the timer B has been over, step S33 judges whether or not the sensor PS1 is off. If the sensor PS1 is on, step S34 increments the state counter; otherwise, step S35 turns the solenoid SL3 on, step S36 sets the path mode to "1" and step S37 sets the state counter to "9".

That is, the timer B is set to a period of time during which a trailing edge of the original document of maximum length transportable along the circulating path "1", namely, along the transporting rollers 5 and 3, reaches the sensor PS1. If the trailing end of the original document has passed the sensor PS1 before timer B is over, the length of the document is judged shorter than the maximum length transportable along the circulating path "1" and then the step S35 sets the path mode to "1". In this case, when the timer B finishes, the leading end of the document has already passed through the change-over claw 15. Therefore, the original document is transported along the transporting roller 6 at the first copy operation and along the circulating path "1" from the second copy operation.

When the state counter is "5", step S38 determines whether or not the timer C is over. In case the timer C has been over, step S39 judges whether or not the sensor PS1 is off. If the sensor PS1 is on, step S40 increments the state counter; otherwise, step S41 turns the solenoid SL3 on, step S42 sets the path mode to "2" and step S43 sets the state counter to "9".

Namely, the timer C is set to a period of time during which a trailing edge of the original document of maximum length transportable along the circulating path "2", that is, along the transporting rollers 6 and 4, reaches the sensor PS1. If the trailing edge of the original document has passed the sensor PS1 by the timer C is over, the length of the document is judged shorter than the maximum length transportable along the circulating path "2" and the step S41 sets the path mode to "2". In this case, when the timer C finishes, the leading edge of the document has not passed through the change-over claw 16. So the original document is transported along the circulating path "2".

When the state counter indicates "6", step S44 determines whether or not the timer D is over. In case the timer D is over, step S45 judges whether or not the sensor PS1 is off. If the sensor PS1 is on, step S46 increments the state counter; otherwise, step S47 sets the path mode to "3" and step S48 sets the state counter to "9".

Namely, the timer D is set to a period of time during which the trailing edge of the original document of maximum length transportable along the circulating path "3", that is, between the transporting rollers 6 and 3, reaches the sensor PS1. If the trailing edge of the original document has passed the sensor PS1 at the time the timer D is over, the length of the document is judged shorter than the maximum length transportable along the circulating path "3" and the step S47 sets the path mode to "3". In this case, when the timer D finishes, the leading end of the document has already passed through the change-over claw 16. Therefore, the original document is transported along the transporting roller 7 at the first copy operation, along the circulating path "3" on and after the second one.

When the state counter indicates "7", step S49 determines whether or not the timer E is over. In case the timer E is over, step S50 judges whether or not the sensor PS1 is off. If the sensor PS1 is on, step S51 increments the state counter; otherwise, step S52 sets the path mode to "4" and step S53 sets the state counter to "9".

Namely, the timer E is set to a period of time during which a trailing edge of the original document of maximum length transportable along the circulating path "4", that is, along the transporting rollers 7 and 4 reaches the sensor PS1. If the trailing end of the original document has passed the sensor PS1 by the timer E is over, the length of the document is judged shorter than the maximum length transportable along the circulating path "4" and the step S52 sets the path mode to "4". The original document is transported along the circulating path "4".

When the state counter indicates "8", step S54 determines whether or not the timer F is over. If the timer F has been over, step S55 judges whether or not the sensor PS1 is off. If the sensor PS1 is on, step S56 sets the path mode to "6" and step S57 increments the state counter; otherwise, step S58 sets the path mode to "5" and step S59 increments the state counter.

Namely, the timer F judges the length of the document shorter than the maximum length transportable along the circulating path "5", that is, along the transporting rollers 7 and 3. Then, the step S58 sets the path mode to "5" to transport the document along the circulating path "5".

If the step S55 determines the sensor PS1 is on, the length of the document is judged longer than the maximum length transportable along the longest circulating path "5" (along the transporting rollers 3 and 7) and it becomes impossible to make a multicopy. So the path mode is set to "6" to finish the copy operation after copying only one sheet and discharge the document.

When the state counter indicates "9", step S60 judges whether or not the sensor PS4 is on. If the sensor PS4 is on, that is, if the leading end of the document is sensed by the sensor PS4, step S61 judges whether or not the copy is the last one. If the copy is not the last one, step S64 checks the path mode. When the path mode indicates "0" or "2" or "4", step S65 turns the solenoid SL4 to on as well as the solenoid SL5 to off. Therefore, the change-over claw 17 protrudes into the transporting path and the original document is made to return along the transporting roller 4. On the other hand, when the path mode indicates "1" or "3" or "5", step S66 turns the solenoid SL4 to off and the solenoid SL5 to on thereby the change-over claw 18 protrudes into the transporting path and returns the transported document along the transporting roller 3. At next, step S69 sets the multicopy flag to 1, and then step S70 sets the state counter to 1 and execute the operation of on and after the step S16.

When the path mode indicates "6", multicopying is impossible as illustrated above. Therefore, step S67 turns both the solenoids SL4 and SL5 to off and retract the change-over claws 17 and 18 from the transporting path thereby the document is transported along the transporting roller 8 and is discharged onto the tray 9. Then step S68 increments the state counter.

If the step S61 determines the copy is last, step S62 turns both the solenoids SL4 and SL5 to off to retract the change-over claws 17 and 18 from the transporting path thereby the document is discharged onto the tray 9 through the document transporting roller 8. Then step S63 increments the state counter.

When the state counter indicates "10", the copying apparatus stands by without executing any processing.

Said operation is only one of the example forms. For example, a path arrangement through which the first sheet is transported in case of the path mode "1" is changeable to the transporting rollers 4 and 6 as well as that in case of the path mode "3" is changeable to the transporting rollers 4 and 7.

Further, to detect the length of the document, the present embodiment uses the timers However, it is possible to use sensors at the predetermined places for detecting the length of the document instead of the timers.

While the present invention has been described with reference to the particular illustrative embodiments, it is not restricted by those embodiments but only by the appended claims. It is to be appreciated that those skilled in the art can change and modify the embodiments without departing from the scope and spirit of the invention.

What is claimed is:

1. A circulating document transporting device comprising:
    a document inserting station;
    first transporting means providing a first transporting path connecting the document inserting station and an exposure station for transportation of an original document inserted into the document inserting station along the first transporting path;
    second transporting means providing a second transporting path connected with the exposure station for discharging an exposed original document from the exposure station;
    first reversing means including a plurality of first reversing paths connected with the second transporting path for reversing the direction of transport of the exposed original document;
    first change-over means for feeding the original document transported along the second transporting path to one of the first reversing paths;
    third transporting means including a third transporting path connected with the first reversing paths for returning the reversed original document in the direction of the first transporting path;
    second reversing means including a plurality of second reversing paths connected with the first transporting path and the third transporting path for reversing the direction of transport of the exposed original document again and feeding it to the first transporting path; and
    second change-over means for feeding the original document transported along the third transporting path to one of the second reversing paths.

2. A circulating document transporting device as claimed in claim 1, further comprising a document discharging station for discharging the document transported along the third transporting path.

3. A circulating document transporting device as claimed in claim 1, wherein the first reversing paths include first reversing rollers and first reversing guide members respectively and the second reversing paths comprise second reversing rollers and second reversing guide members respectively.

4. A circulating document transporting device as claimed in claim 3, wherein the first change-over means comprises a plurality of first change-over claws which are provided corresponding with the first reversing rollers respectively and which protrude into and retract from the second transporting path, and the second change-over means disposes a plurality of second change-over claws each of which are located corresponding with the second reversing rollers and capable of insertion into and retraction from the third transporting path.

5. A circulating document transporting device as claimed in claim 3, wherein there are at least two first reversing rollers and at least two second reversing rollers and the distance between the two first reversing rollers is different from the distance between the two second reversing rollers.

6. A circulating document transporting device as claimed in claim 1, further comprising document size detecting means for detecting the size of the original document inserted from the document inserting station and controlling means for controlling the first reversing means and the second reversing means according to the size of the original document.

7. A circulating document transporting device for transporting an original document to an exposure station circularly, comprising:
    first reversing means including a plurality of first reversing paths to reverse an exposed document;
    second reversing means including a plurality of second reversing paths for reversing the original document reversed by the first reversing means once more to feed it again to the exposure station;
    first change-over means for feeding the original document into one of the first reversing paths;
    second change-over means for sending the original document into one of the second reversing paths; and
    controlling means for controlling the first and the second change-over means to transport the original document to the exposure station circularly.

8. A circulating document transporting device as claimed in claim 7, further comprising document size detecting means for detecting the size of the original document inserted from an document inserting station, the controlling means thus controlling the first and the second reversing means in accordance with the size of the document.

9. A copying apparatus comprising:
    a document exposure station;
    a document inserting station which is a predetermined distance apart from the document exposure station;

first transporting means which includes a first transporting path connecting the document inserting station and the document exposure station for transporting an original document inserted into the document inserting station to the exposure station along the first transporting path;

image forming means for forming an image of the original document passing through the exposure station on a copying paper;

second transporting means including a second transporting path connected with the exposure station for discharging the document out of the exposure station;

first reversing means comprising a plurality of first reversing paths connected with the second transporting path for reversing the direction of transport of the exposed document;

first change-over means for sending the original document transported along the second transporting path into one of the first reversing paths;

third transporting means providing a third transporting path connected with the first reversing means for sending the reversed document in the direction of the first transporting path;

second reversing means including a plurality of second reversing paths connected with the first and the third transporting paths for reversing the exposed document again and sending it into the first transporting path; and second change-over means for sending the document transported along the third transporting path into one of the second reversing paths.

10. A copying device as claimed in claim 9 further comprising a document discharging station for discharging the document transported along the third transporting path.

11. A copying device as claimed in claim 9 further comprising means for inputting the number of copy papers copied from the original document, and controlling means for controlling the second change-over means according to the number of copies.

12. A copying apparatus as claimed in claim 9, further comprising document size detecting means for detection of the original document size inserted into the document inserting station, and controlling means for controlling the first and the second change-over means in accordance with the size of the original document.

13. A method of circulating an original document to an exposure station comprising the steps of:

inserting the original document into a document inserting station;

transporting the inserted document along a first transporting path which connects the document inserting station and the exposure station;

discharging the exposed document from the exposure station to a second transporting path connected with the exposure station;

reversing the direction of transport of the exposed document by transporting the exposed document along one of a plurality of first reversing paths connected with the second transporting path;

returning the reversed document in the direction of the first transporting path along a third transporting path connected with the first reversing paths; and reversing the exposed document again and transporting it into the first transporting path by transporting the exposed document along one of a plurality of second reversing paths connected with the first and the third transporting paths.

14. A method as claimed in claim 13, further comprising the steps of inputting the number of circulations and discharging the document from the third transporting path to the document discharging station after circulating the document the input number of times.

15. A method as claimed in claim 13 further comprising the steps of detecting the size of the original document and selecting one of the first reversing paths as well as one of the second reversing paths according to the detected size.

* * * * *